United States Patent
Takagaki et al.

(10) Patent No.: US 6,454,827 B2
(45) Date of Patent: Sep. 24, 2002

(54) FILTER MEDIUM AND PRODUCTION METHOD THEREOF

(75) Inventors: Takanari Takagaki; Kouichi Oda; Minoru Honda, all of Kariya (JP)

(73) Assignee: Toyoda Boshoku Corporation, Kariya (JP)

(*) Notice: Subject to any disclaimer, the term of this patent is extended or adjusted under 35 U.S.C. 154(b) by 0 days.

(21) Appl. No.: 09/842,708

(22) Filed: Apr. 27, 2001

(30) Foreign Application Priority Data

Apr. 28, 2000 (JP) .......................... 2000-131128
Sep. 27, 2000 (JP) .......................... 2000-294734

(51) Int. Cl.$^7$ .............................................. B01D 39/16
(52) U.S. Cl. ............................ 55/492; 55/514; 55/521; 55/527; 55/DIG. 5; 210/490; 427/202; 427/244; 264/112; 264/171.13; 264/255; 264/257; 156/167; 156/242; 156/308.4
(58) Field of Search ......................... 55/492, 495, 497, 55/512, 514, 521, 527, DIG. 5; 210/490, 491, 492, 493.1; 96/154; 264/248, 255, 273, 274, 112, 251, 171.13, 257; 427/180, 202, 244; 156/167, 242, 245, 308.4

(56) References Cited

U.S. PATENT DOCUMENTS

| | | | | |
|---|---|---|---|---|
| 2,945,557 A | * | 7/1960 | Powers ........................ 210/499 |
| 3,727,769 A | * | 4/1973 | Scholl .......................... 156/199 |
| 4,004,899 A | * | 1/1977 | Giacovas ...................... 55/499 |
| 4,181,514 A | * | 1/1980 | Lefkowitz et al. ........... 210/504 |
| 4,701,197 A | * | 10/1987 | Thornton et al. ............ 210/491 |
| 4,925,601 A | * | 5/1990 | Vogt et al. ................... 156/167 |
| 5,039,431 A | * | 8/1991 | Johnson et al. .............. 156/286 |
| 5,069,694 A | * | 12/1991 | Cullen et al. ................. 206/0.7 |
| 5,271,883 A | * | 12/1993 | Timmons et al. ............ 156/167 |
| 5,674,302 A | * | 10/1997 | Nakayama et al. .......... 210/493.1 |
| 5,753,343 A | * | 5/1998 | Braun et al. .................. 210/493.1 |
| 6,099,729 A | * | 8/2000 | Cella et al. ................... 210/315 |
| 6,156,089 A | * | 12/2000 | Stemmer et al. ............. 55/467 |

FOREIGN PATENT DOCUMENTS

| JP | 08-38834 A | * | 2/1996 |
|---|---|---|---|
| JP | 10-128020 A | | 5/1998 |

* cited by examiner

Primary Examiner—David A. Simmons
Assistant Examiner—Frank M. Lawrence
(74) Attorney, Agent, or Firm—Oliff & Berridge, PLC

(57) ABSTRACT

A filter medium has a function member accommodated between two fiber layers. A production method for manufacturing a filter medium includes the steps of: preparing a first fiber layer having a shape identical to that of a side surface of the filter medium; disposing a function member on a surface of the first fiber layer; and forming a second fiber layer by spinning partially melted fibers onto the function member disposed on the surface of the first fiber layer. Therefore, it is unnecessary to carry out press-forming in a state in which the function member is sandwiched between nonwoven fabrics, and a countermeasure to prevent the function member from falling out and a countermeasure to prevent the nonwoven fabric from being torn by the function member are unnecessary.

27 Claims, 11 Drawing Sheets

FILTER MEDIUM AND PRODUCTION METHOD THEREOF

BACKGROUND OF THE INVENTION

1. Field of Invention

The invention relates to a filter medium and a method for producing the filter medium using a function member accommodated between two fiber layers.

2. Description of Related Art

As a filter for an internal combustion engine, for example, a filter of a sandwich structure in which activated carbon for absorbing fuel vapor is accommodated between nonwoven fabrics which filters air is used. FIG. 12 is an exploded perspective view showing a portion of a production process of a filter 100.

In producing the filter 100, a flat nonwoven fabric is first produced. Next, activated carbon is accommodated between two sheets of the nonwoven fabric, and the sheets of nonwoven fabric are press-formed into a corrugated shape, thereby forming a filter body 102. Then, both corrugated ends of the filter body 102 are adhered to side sheets 104 and the filter body 102 is maintained in a predetermined shape, thereby completing the filter 100.

In the above production method of the filter 100, however, the activated carbon is sandwiched between the two sheets of nonwoven fabric and then the sheets of nonwoven fabric are press-formed into the corrugated shape to form the filter body 102. Therefore, when the sheets of nonwoven fabric are press-formed, it is necessary to prevent the activated carbon from falling out as well as to prevent the nonwoven fabric from being torn. Thus, there is a problem that much labor is required for forming the filter 100, thereby increasing the production cost.

SUMMARY OF THE INVENTION

It is an object of the invention to improve the forming efficiency when a filter medium is produced, as well as to reduce the production cost of the filter medium.

According to a first aspect of the invention, there is provided a production method of a filter medium comprising the steps of: preparing a first fiber layer formed into the same shape as that of one side surface of the filter medium; disposing a function member on a surface of the first fiber layer; and forming a second fiber layer by spinning partially melted fibers on the function member disposed on the surface of the first fiber layer.

According to the first aspect, the filter medium can be formed by laminating the function member and the second fiber layer in this order on the first fiber layer which is formed in a shape identical to that of one side surface of the filter medium. Thus, it is unnecessary to carry out press-forming in a state in which the function member is sandwiched between nonwoven fabrics. Therefore, a countermeasure to prevent the filter medium from falling out and a countermeasure to prevent the nonwoven fabric from being torn by the filter medium are unnecessary. Therefore, the forming efficiency when the filter medium is formed is improved and the production cost of the filter medium can be reduced.

Here, the function member may include various members such as a member having a function of absorbing fuel vapor, a member having a moisture absorbing function, a member having a deodorant function, and a member having a function of reinforcing the filter medium.

In the above aspect, the partially melted fibers can be spun to a die surface to form the first fiber layer. This facilitates the forming of the first fiber layer.

In the above aspect, a recess of a bag-like portion provided in a filter portion of the first fiber layer can be filled with the function member. With this, even if the recess tries to deform by negative pressure of fluid flowing through the bag-like portion, the deformation is suppressed by the function member filled in the recess. Therefore, it is possible to prevent the ventilation resistance of the filter medium from being increased.

In the above aspect, the function member may be disposed inward of an edge of the first fiber layer, and the second fiber layer may be laminated on this function member and the first fiber layer. By doing this, the function member is sealed by the joined portion between the edge of the first fiber layer and the edge of the second fiber layer. Thus, the function member does not fall out from between the first fiber layer and the second fiber layer irrespective of whether the function member In the above aspect, in a state in which the second fiber layer has plasticity, superposed edges of the first fiber layer and the second fiber layer can be pressed together. By doing this, the edge of the first fiber layer and the edge of the second fiber layer can be joined to each other strongly and the sealing strength of the edge of the filter medium is enhanced. Further, since the edge is cured into a plate-like shape, the edge becomes a support flange for the filter medium and the rigidity of the entire filter medium is enhanced.

In the above aspect, the function member may be disposed such that an edge thereof is located outward of an edge of the first fiber layer. This enables a support flange to be formed by the function member on the edge of the filter medium.

According to a second aspect of the invention, the filter medium comprises a first fiber layer formed in a shape identical to that of one side surface of the filter medium and having a filter portion including a bag-like portion; a function member filled in the bag-like portion of the first fiber layer; and a second fiber layer disposed on a surface of the function member. Therefore, it is unnecessary to carry out press-forming in a state in which the function member is sandwiched between the nonwoven fabrics, the forming efficiency when the filter medium is formed is improved, and the production cost of the filter medium can be reduced. Further, even if the recess tries to deform in a contractive direction by negative pressure of fluid passing through the bag-like portion, the deformation is suppressed by the function member filled in the recess.

BRIEF DESCRIPTION OF THE DRAWINGS

These and other objects, advantages and salient features of the invention will be described in or are apparent from the following detailed description of exemplary embodiments, wherein like numerals represent like parts, and wherein.

DETAILED DESCRIPTION OF PREFERRED EMBODIMENTS

First Embodiment

Figure 1A:
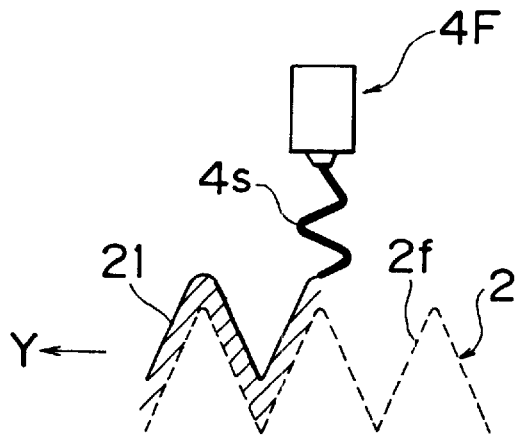
FIGS. 1A through 1C are schematic views showing production steps in a production method of a filter according to a first embodiment of the invention.
Figure 6:
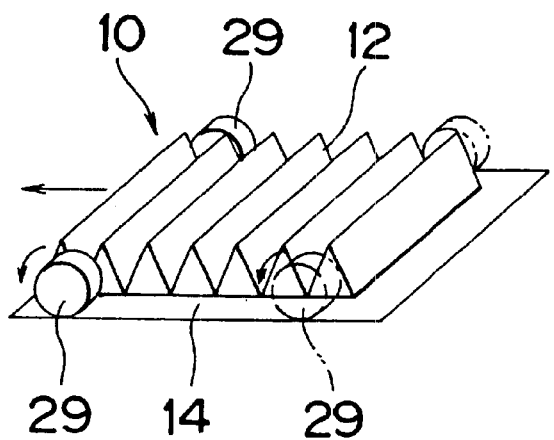
FIG. 6 is a perspective view showing a step of pressurizing an edge of the filter.

A production method of a filter medium according to a first embodiment of the invention will hereinafter be described based on FIGS. 1, 2 and 6. This embodiment relates to a production method of a filter medium (filter, hereinafter). FIGS. 1A, 1B and 1C are schematic views showing production steps of the filter, and FIGS. 2A and 2B are schematic perspective views of a filter producing system. FIG. 6 is a perspective view showing a step of pressurizing an edge of the filter.

As shown in FIG. 6, a filter 10 comprises a filter body 12 formed in a corrugated shape, and an outer peripheral frame 14 constituting a periphery of the filter body 12. The filter body 12 and the outer peripheral frame 14 are integrally formed together.

As shown in FIG. 2B and the like, the filter 10 comprises an activated carbon 23 which absorbs fuel vapor or the like. The activated carbon 23 is sandwiched between a first nonwoven fabric 21 and a second nonwoven fabric 22. A layer of the activated carbon 23 is formed at a predetermined position of the filter body 12. FIG. 2B is a transverse sectional view of a portion 2B in FIG. 2A.

As shown in FIG. 2A, a filter producing system 1 includes a production line R extending in a Y direction. A plurality of forming dies 2 are disposed on the production line R such that the forming dies 2 can move horizontally along the production line R. Each forming die 2 includes a forming surface 2f of a shape identical to that of a back surface of the filter 10, and may be made, for example, of permeable metal mesh.

Spinning nozzles 4 are positioned at a constant height in the production line R. A plurality (five in FIG. 2A) of spinning nozzles 4 disposed in a widthwise direction of the production line R are used as a set, and two sets of these spinning nozzles 4 are provided in the Y direction. The spinning nozzles 4 of one of the sets disposed upstream of the production line R are called upstream nozzles 4F, and spinning nozzles 4 of the other set disposed downstream are called downstream nozzles 4K.

The spinning nozzles 4 are nozzles utilizing a melt-blow method, for example, in which fiber resin injected from an extruder (not shown) is deposited on the forming surface 2f of the forming die 2. At this time, the resin fibers are in a partially melted state. Fibers spun to the forming surface 2f come into contact with each other and fuse, and a layer of those fibers becomes nonwoven fabric. It is also possible to use nozzles utilizing a spin-bonding method as the spinning nozzles 4.

A production method of the filter 10 will be described next.

First, a forming die 2 is moved horizontally in the Y direction along the production line R. Then, when a front tip end with respect to the Y direction of the die 2 reaches a position directly below the upstream nozzles 4F, partially melted fibers 4S spun out from the upstream nozzles 4F are deposited onto the forming surface 2f of the forming die 2. At this time, since the forming die 2 continues moving in the Y direction with respect to the upstream nozzles 4F, the partially melted fibers 4S are supplied to the entire length of the forming surface 2f of that forming die 2, beginning from the front tip end side. The supplied fibers 4S come into contact with each other and fuse at the contact points, and a layer of those fibers 4S becomes the first nonwoven fabric 21.

Figure 1B:
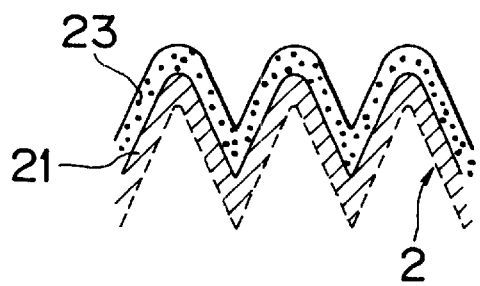
Figure 1C:
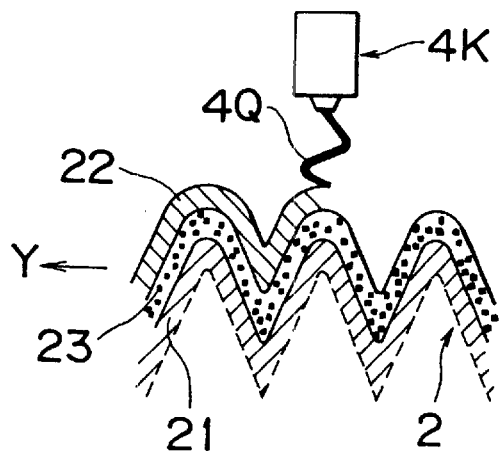
Figure 2A:
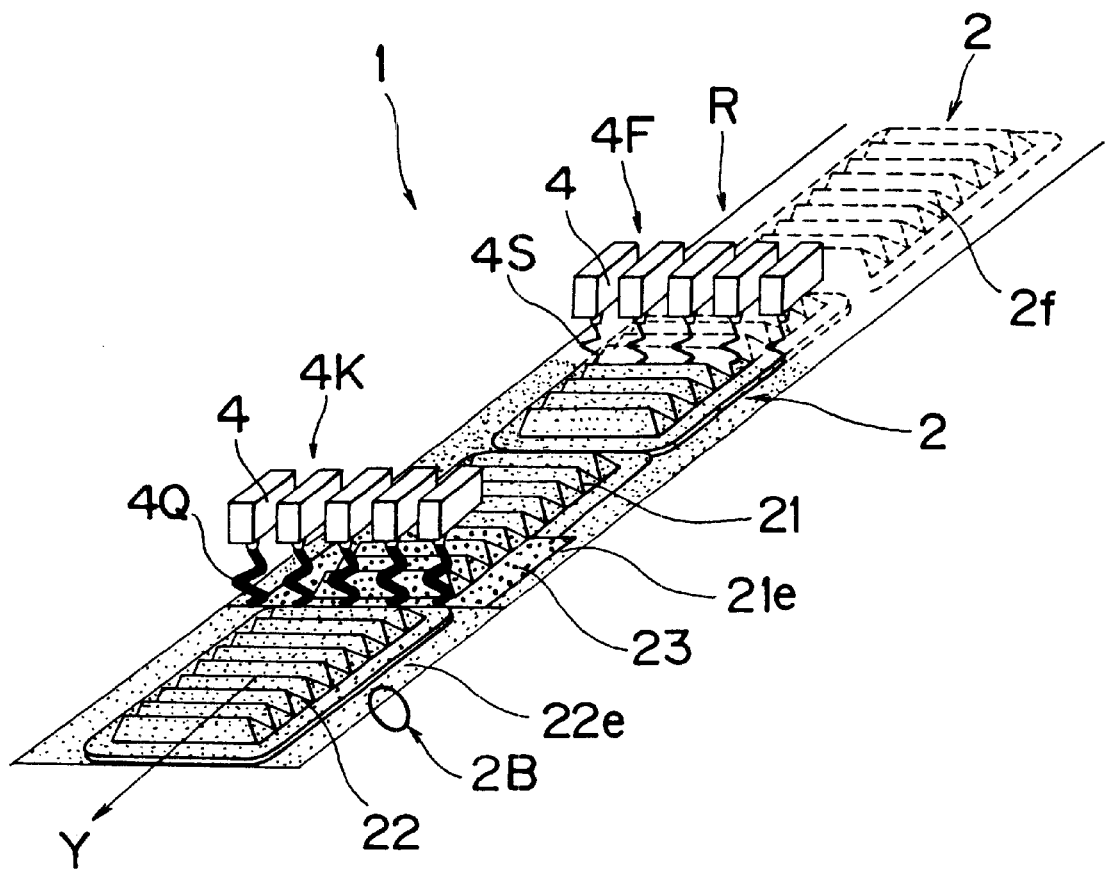
FIG. 2A is a schematic perspective view of a filter producing system.
Figure 2B:
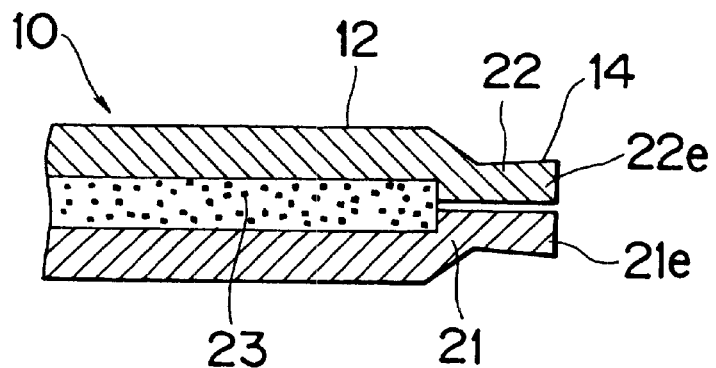
FIG. 2B is a transverse sectional view of a portion 2B in FIG. 2A.

The forming die 2 covered with the first nonwoven fabric 21 in this manner is transferred to a position where the activated carbon 23 is supplied, and the activated carbon 23 is deposited onto a predetermined position corresponding to the filter body 12 as shown in FIG. 1B. At this time, a range in which the activated carbon 23 is deposited is set such that the activated carbon 23 is not deposited on an edge 21 e of the first nonwoven fabric 21 (see FIG. 2A).

When the forming die 2 on which the activated carbon 23 has been deposited on the first nonwoven fabric 21 reaches the downstream nozzles 4K, partially melted fibers 4Q spun out from the downstream nozzles 4K are deposited.

At this time, since the forming die 2 continues moving in the Y direction with respect to the downstream nozzles 4K, the partially melted fibers 4Q are supplied onto the entire length of the first nonwoven fabric 21 and the activated carbon 23 on the forming die 2, beginning from the front tip end side. The supplied fibers 4Q come into contact with each other and are fused at the contact points, and the layer of those fibers 4Q becomes the second nonwoven fabric 22. At this time, the fibers 4Q of the second nonwoven fabric 22 and the fibers 4S of the first nonwoven fabric 21 come into direct contact with each other at a portion where the layer of the activated carbon 23 does not exist, i.e., at the edge 21e of the first nonwoven fabric 21. Therefore, the fibers 4S and 4Q are fused at the contact points and the second nonwoven fabric 22 is adhered to the first nonwoven fabric 21.

When the formation of the second nonwoven fabric 22 in this manner in complete, as shown in FIG. 6, the edge 22e of the second nonwoven fabric 22 superposed on an edge 21e of the first nonwoven fabric 21 is pressed by rollers 29, for example. With this operation, the edge 21e of the first nonwoven fabric 21 and the edge 22e of the second nonwoven fabric 22 are strongly joined to each other and the sealing strength of the edge of the filter 10 is enhanced. Further, since the edges 21e and 22e of the nonwoven fabrics 21 and 22 are cured into resin plates, the edges 21e and 22e become a support flange for the filter 10, and rigidity of the entire filter 10 is enhanced. It is also possible to use a press or the like instead of the rollers 29.

According to the above-described production method of the filter 10, the filter 10 can be produced by laminating the first nonwoven fabric 21, the activated carbon 23 and the second nonwoven fabric 22 on the forming surface 2f of the forming die 2 in this order. Therefore, unlike a conventional method, a press-forming step, an adhering step and the like are unnecessary, and the production efficiency of the filter 10 is improved. Further, since the edge 22e of the second nonwoven fabric 22 is directly laminated and fused to the edge 21e of the first nonwoven fabric 21, the activated carbon 23 does not fall out from between the first nonwoven fabric 21 and the second nonwoven fabric 22. Further, since the edge 22e of the second nonwoven fabric 22 is superposed on the edge 21e of the first nonwoven fabric 21 and is pressed in this state, the edges 21e and 22e of the nonwoven fabrics 21 and 22 are strongly joined to each other, and the sealing strength of the edge of the filter 10 is enhanced.

Although the edge 21e of the first nonwoven fabric 21 and the edge 22e of the second nonwoven fabric 22 are pressurized from a thickness direction thereof in the above description, it is also possible to pressurize the nonwoven fabrics 21 and 22 from a widthwise direction of the edges 21e and 22e.

Also, since the corrugated portion of the filter body 12 is formed using the forming surface 2f of the forming die 2, excessive tensile forces are not applied to the outer surfaces of the nonwoven fabrics 21 and 22, unlike a case in which flat nonwoven fabrics or the like are bent to form the corrugated portion. Therefore, the nonwoven fabrics 21 and 22 are less prone to breaking, and there is not the drawback of the activated carbon 23 falling out over time. In the present embodiment, the above-described activated carbon 23 corresponds to a function member of this invention, and the forming surface 2f of the forming die 2 corresponds to a die surface of this invention.

A particulate activated carbon, a powdery activated carbon or an activated carbon fiber, for example, may be used as the activated carbon 23.

Second Embodiment

A production method of a filter according to a second embodiment of the invention will hereinafter be described based on FIGS. 3 and 4. This embodiment relates to a production method of a filter in which a skeleton framework is incorporated between nonwoven fabrics, and apparatuses and the like used in the first embodiment are used. The apparatuses and the like used in the first embodiment are designated with the same numbers, and a description thereof is omitted.

Figure 3A:
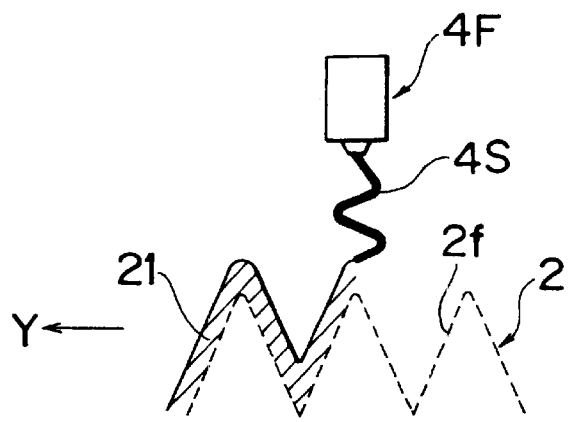
FIGS. 3A through 3C are schematic views showing production steps in a production method of a filter according to a second embodiment of the invention.

First, as with the first embodiment, the forming die 2 is moved horizontally in the Y direction along the production line R, and when the front tip end of the forming die 2 reaches a position directly below the upstream nozzles 4F, the partially melted fibers 4S spun out from the upstream nozzles 4F are deposited on the forming surface 2f of the forming die 2 (see FIG. 3A). Thus, the first nonwoven fabric 21 is formed by the partially melted fibers 4S on the forming surface 2f of the forming die 2, beginning from the front tip end side.

Figure 3B:
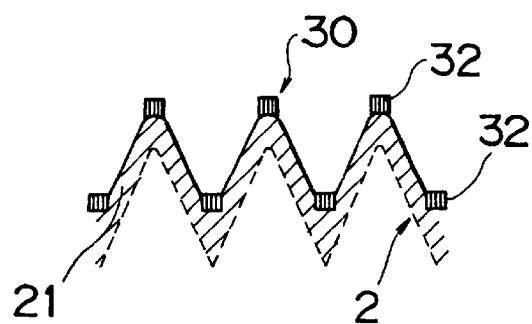
Figure 4A:
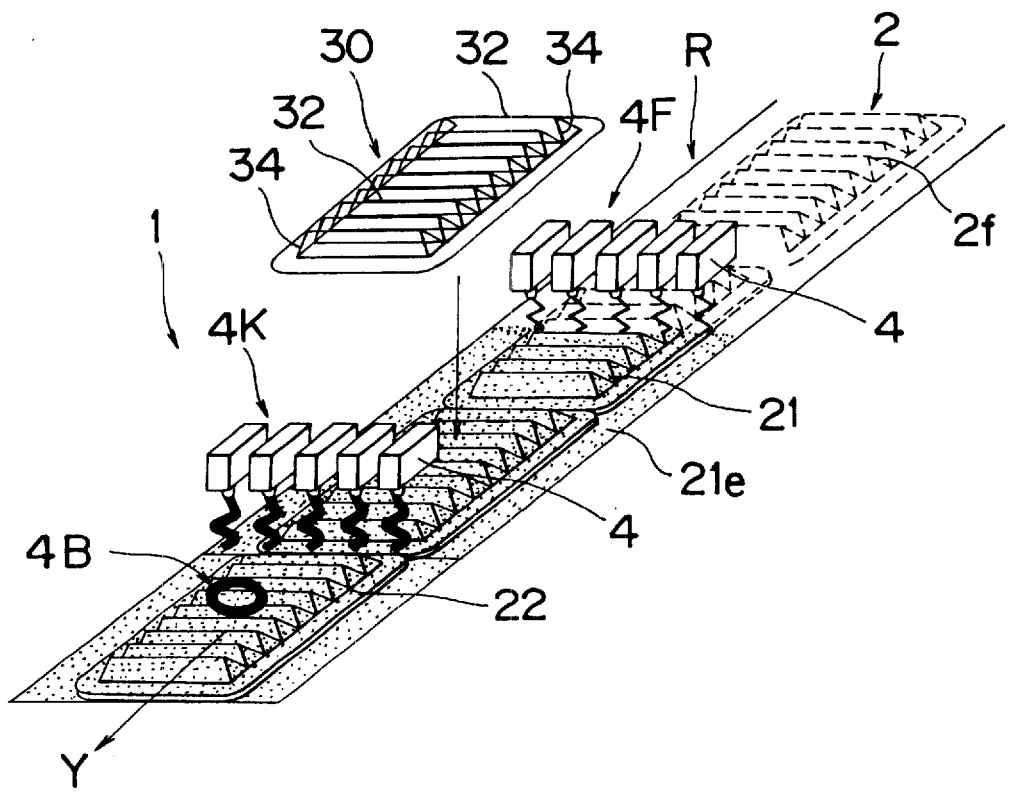
FIG. 4A is a schematic perspective view of a filter producing system.

Next, as shown in FIG. 3B, a skeleton frame 30 is set at a predetermined position on the forming die 2 covered with the first nonwoven fabric 21. As shown in FIG. 4A, the skeleton frame 30 comprises a plurality of beams 32 and columns 34, and is substantially the same shape as the filter 10. The size of the skeleton frame 30 is so set that the skeleton frame 30 can be accommodated on the edge 21e of the first nonwoven fabric 21.

Figure 3C:
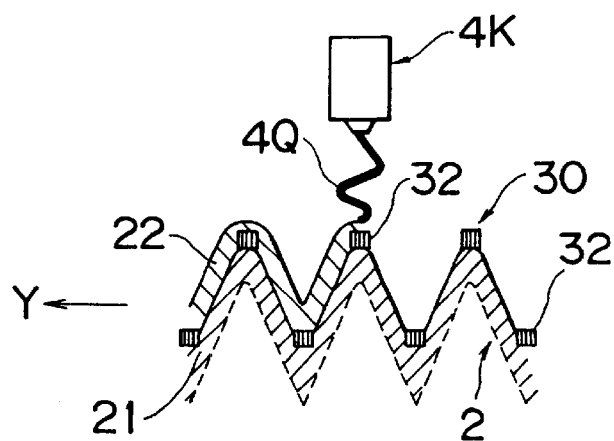
Figure 4B:
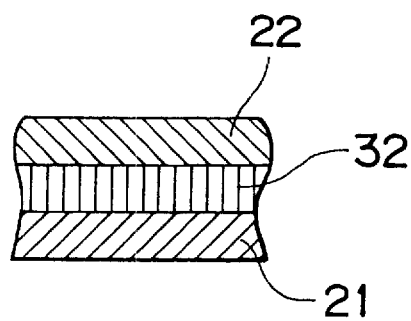
FIG. 4B is a transverse sectional view of a portion 4B in FIG. 4A.

When the forming die 2 on which the skeleton frame 30 is set on the first nonwoven fabric 21 reaches the position of the downstream nozzles 4K, the partially melted fibers 4Q spun out from the downstream nozzle 4K are deposited. With this, the second nonwoven fabric 22 is formed by the partially melted fibers 4Q on the first nonwoven fabric 21 and the skeleton frame 30, beginning from the front tip end side as shown in FIGS. 3C and 4B. FIG. 4B is a transverse sectional view of a portion 4B in FIG. 4A.

At this time, the fibers 4Q of the second nonwoven fabric 22 come into direct contact with a portion of the surface of the first nonwoven fabric 21 where the beams 32 and the columns 34 of the skeleton frame 30 do not exist. As a result, the fibers 4S and 4Q fuse at the contact points and the second nonwoven fabric 22 is adhered to the first nonwoven fabric 21.

When deposition of the second nonwoven fabric 22 is complete, the edge 22e of the second nonwoven fabric 22 superposed on the edge 21e of the first nonwoven fabric 21 is pressed and strongly joined (using a roller 29 or the like, for example) in the same manner as that of the first embodiment, and the edges 21e and 22e are cured into a plate and become a support flange for the filter 10.

According to the production method of the filter 10, the filter 10 can be produced by laminating the first nonwoven fabric 21, the skeleton frame 30 and the second nonwoven fabric 22 on the forming surface 2f of the forming die 2 in this order, thereby increasing the production efficiency of the filter 10. Further, since the skeleton frame 30 is incorporated between the first nonwoven fabric 21 and the second nonwoven fabric 22, the rigidity of the filter 10 is greatly enhanced. In this embodiment, the above-mentioned skeleton frame 30 corresponds to the function member of this invention.

Third Embodiment

Figure 5A:
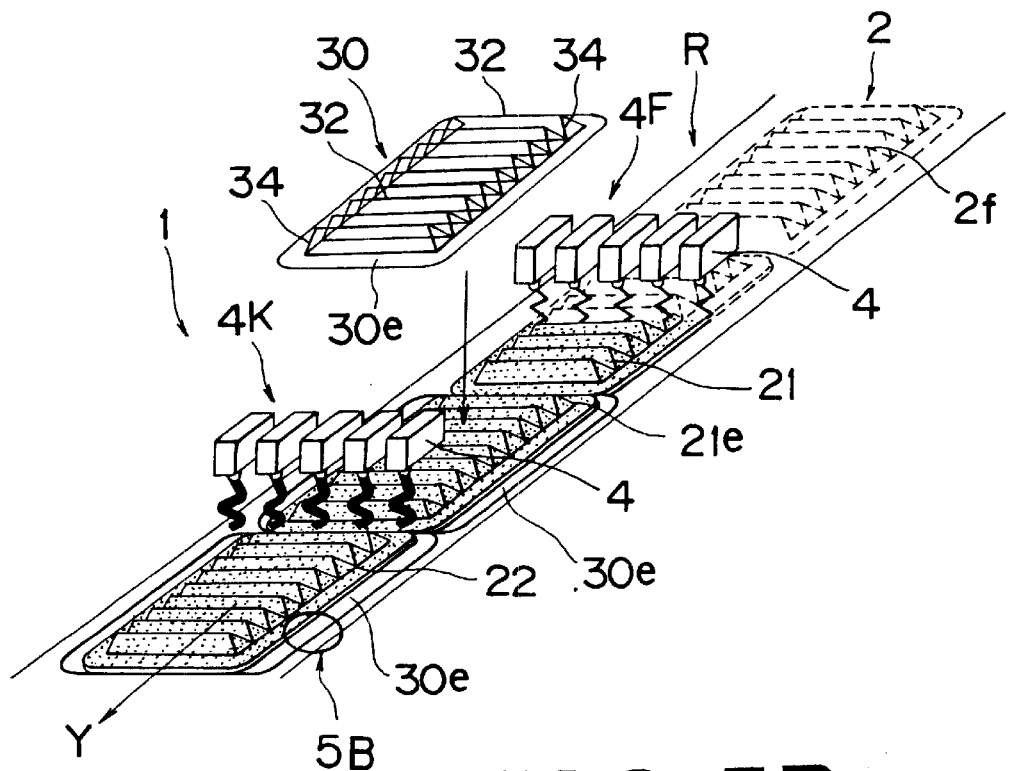
FIG. 5A is a schematic perspective view of a filter producing system according to a third embodiment of the invention.
Figure 5B:
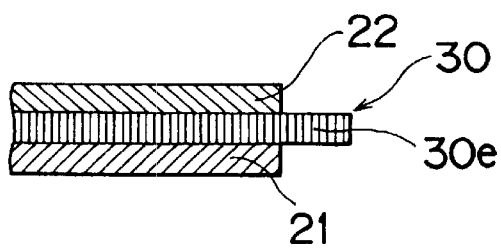
FIG. 5B is a sectional view of a portion 5B in FIG. 5A.
Figure 5C:
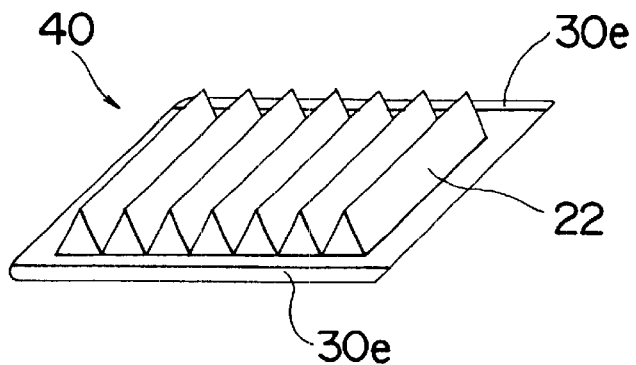
FIG. 5C is a perspective view of a filter.

A production method of a filter according to a third embodiment of the invention will hereinafter be described based on FIGS. 5A–5C. In a filter 40 according to this embodiment, the size of the skeleton frame 30 used in the filter 10 according to the second embodiment is changed such that an end edge of the edge 30e of the skeleton frame 30 can be disposed on the outside of the edges 21e and 22e of the nonwoven fabrics 21 and 22. The other structure is the same as that of the filter according to the second embodiment. Thus, the apparatuses and the like used in the second embodiment are designated with the same numbers, and a description thereof is omitted.

As in the second embodiment, the skeleton frame 30 according to the third embodiment has a plurality of beams 32 and columns 34 such that it is substantially the same shape as the filter 40. A frame-like edge 30e is formed around the periphery of the columns 34 and the like. The size of the skeleton frame 30 is set such that a region wider than the first nonwoven fabric 21 can be covered. In a state in which the skeleton frame 30 is set on an upper surface of the first nonwoven fabric 21, as shown in FIGS. 5A and 5B, the edge 30e of the skeleton frame 30 projects from the edge 21e of the first nonwoven fabric 21 by a predetermined length.

When the skeleton frame 30 is set on the upper surface of the first nonwoven fabric 21, the partially melted fibers 4Q are spun to a region which is equivalent to the region of the first nonwoven fabric 21 at a position corresponding to the downstream nozzles 4K so as to form the second nonwoven fabric 22. At this time, the fibers 4Q of the second nonwoven fabric 22 come into direct contact with each other at a portion where the beams 32 and the columns 34 of the skeleton frame 30 do not exist, and the second nonwoven fabric 22 is adhered to the first nonwoven fabric 21 (see FIG. 5C).

When the second nonwoven fabric 22 is formed, the filter 40 is complete. The edge 30e of the skeleton frame 30 projected from the edges 21e and 22e of the nonwoven fabrics 21 and 22 becomes a support flange of the filter 40. A hard material having a necessary strength for reinforcing the filter 10 and a necessary strength for the support flange is used as a material for the skeleton frame 30.

In this way, according to the above-described production method of the filter 40, the filter 40 and the support flange 30e for the filter 40 can be produced at the same time by superposing the first nonwoven fabric 21, the skeleton frame 30 and the second nonwoven fabric 22 on the forming surface 2f of the forming die 2 in this order. Therefore, the step of forming the support flange by pressurizing the edges 21e and 22e of the nonwoven fabrics 21 and 22 is unnecessary.

Although the activated carbon 23 or the skeleton frame 30 is accommodated between the nonwoven fabrics 21 and 22 in the first through the third embodiments, both the activated carbon 23 and the skeleton frame 30 may be accommodated between the nonwoven fabrics 21 and 22. Alternatively, it is also possible to accommodate various materials having a function required for the filter 10 between the nonwoven fabrics 21 and 22.

Also, although an example was given in which the filter 10 comprises the forming die 2 having a corrugated forming surface 2f, the shape of the forming surface 2f can be changed appropriately.

In addition, although an example was given in which the spinning nozzles 4 are disposed upstream and downstream in the production line R, it is also possible to form the first nonwoven fabric 21 and the second nonwoven fabric 22 by disposing the spinning nozzles 4 in one place and moving the forming die 2 forward in the Y direction to form the first nonwoven fabric 21, then moving the forming die 2 backward to the original position, and then moving it forward again to form the second nonwoven fabric 22. Alternatively, the second nonwoven fabric 22 could be formed while the die 2 is being moved backward.

Also, the lamination structure of fibers in the filter and/or the material for the filter can be changed as desired by disposing the spinning nozzles in a plurality of locations on the production line and changing the diameter and material of the fiber at each spinning nozzle 4.

In a filter having the skeleton frame 30 between the nonwoven fabrics 21 and 22, after the second nonwoven fabric 22 is formed, the surface of the filter may be pressurized by a press, thereby shaping the entire filter.

Fourth Embodiment

A filter and a production method of the filter according to a fourth embodiment of the invention will hereinafter be described based on FIGS. 7 to 9. In a filter 50 according to the fourth embodiment, the position where the activated carbon 23 is accommodated is changed as compared to the filter 10 of the first embodiment. The other structure is the same as that of the filter 10 according to the first embodiment. Thus, the apparatuses and the like used in the first embodiment are designated with the same numbers, and a description thereof is omitted.

Figure 7:
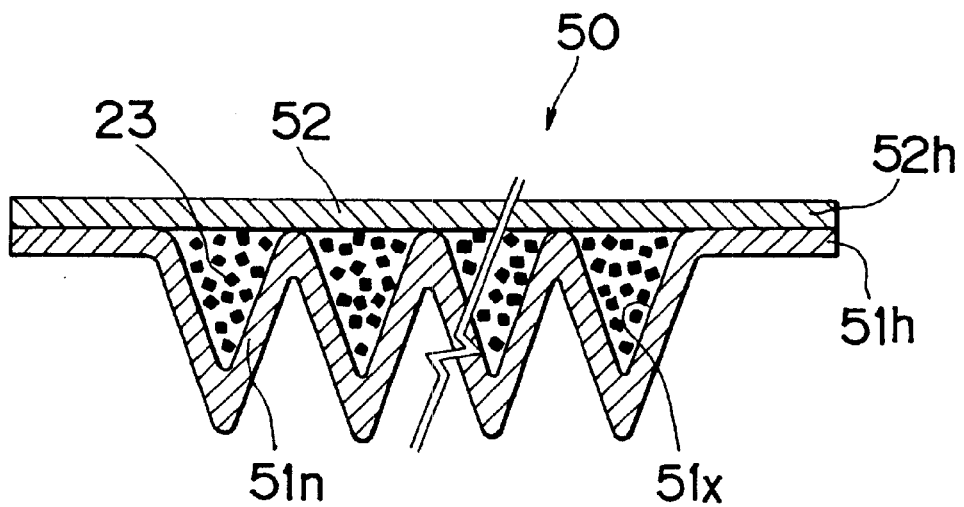
FIG. 7 is a vertical sectional view of a filter according to a fourth embodiment of the invention.

As shown in FIG. 7, the filter 50 according to this embodiment comprises a first nonwoven fabric 51, a second nonwoven fabric 52 and particles of activated carbon 23 sandwiched between both of these nonwoven fabrics 51 and 52. The first nonwoven fabric 51 includes a corrugated portion 5n which becomes a filter body (filter portion), and an edge 51h which becomes an outer peripheral frame. The particles of the activated carbon 23 are accommodated in recesses 51x, which have inverse triangular cross sections, of the corrugated portion 5n so as to fill in those recesses 51x. The second nonwoven fabric 52 is formed into a flat plate shape identical to a plan-view shape of the first nonwoven fabric 51. An edge 52h of the second nonwoven fabric 52 is joined to the edge 51h of the first nonwoven fabric 51. With this structure, the recesses 51x are closed by the second nonwoven fabric 52 and the activated carbon 23 is accommodated between the first nonwoven fabric 51 and the second nonwoven fabric 52.

In this embodiment, the corrugated portion 51n corresponds to a bag portion.

Figure 8A:
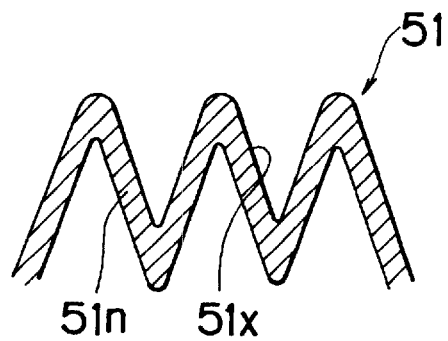
FIGS. 8A through 8C are schematic views showing production steps in a production method of the filter according to a fourth embodiment of the invention.
Figure 8B:
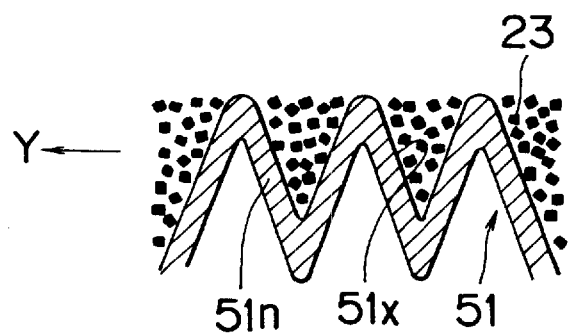

Next, a production method of the filter 50 will be described based on FIGS. 8A through 8C.

First, the first nonwoven fabric 51 having the corrugated portion 51n and the edge 51h is prepared. As the first nonwoven fabric 51, an existing filter may be used as it is, for example, or a new first nonwoven fabric 51 may be produced by pressing a flat plate-like nonwoven fabric.

The first nonwoven fabric 51 prepared in this manner is set on the production line R of the filter producing system 1 described in the first embodiment. Here, in the filter producing system 1 described in the first embodiment, the first nonwoven fabric 21 is formed using the forming die 2. In the fourth embodiment, however, since the first nonwoven fabric 51 has already been formed, the forming die 2 is unnecessary.

When the first nonwoven fabric 51 is set on the production line R in this manner, the production line R is moved horizontally in the Y direction. When the first nonwoven fabric 51 is transferred to a supply position of the activated carbon 23, as shown in FIG. 8B, the particles of the activated carbon 23 are supplied to the recesses 51x of the corrugated portion 51n of the first nonwoven fabric 51, and the recesses 51x are filled with the activated carbon 23. At this time, a dispersion range of activated carbon 23 is set such that the particles of the activated carbon 23 are not applied to the edge 51h of the first nonwoven fabric 51. Here, the recesses 51x being filled with the activated carbon 23 refers to accommodating in the recesses 51x activated carbon 23 of an amount so as to suppress, as much as possible, deformation when wall surfaces of the recesses 51x try to deform in a direction in which the wall surfaces tightly contact each other by a negative pressure of fluid.

When the first nonwoven fabric 51 whose recesses 51x are filled with the activated carbon 23 reaches the position of the downstream nozzles 4K, the partially melted fibers 4Q spun out from the downstream nozzles 4K are deposited.

Figure 8C:
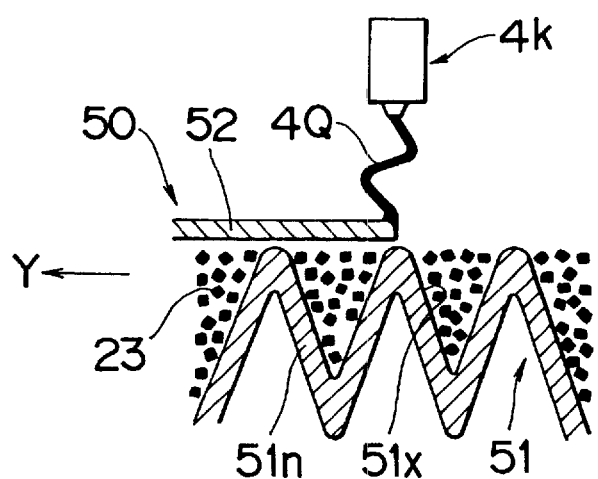

With this operation, as shown in FIG. 8C, the second nonwoven fabric 52 is formed on the first nonwoven fabric 51 and the activated carbon 23 by the partially melted fibers 4Q, beginning from the front tip end side of the first nonwoven fabric 51. At this time, at the edge 51h of the first nonwoven fabric 51, the fibers of the edge 51h and the fibers 4Q of the second nonwoven fabric 52 come into contact with each other such that these fibers are fused at the contact points and the first nonwoven fabric 51 is adhered to the second nonwoven fabric 52. Thus, the particles of the activated carbon 23 are accommodated between the first nonwoven fabric 51 and the second nonwoven fabric 52 to complete the filter 50.

Figure 9A:
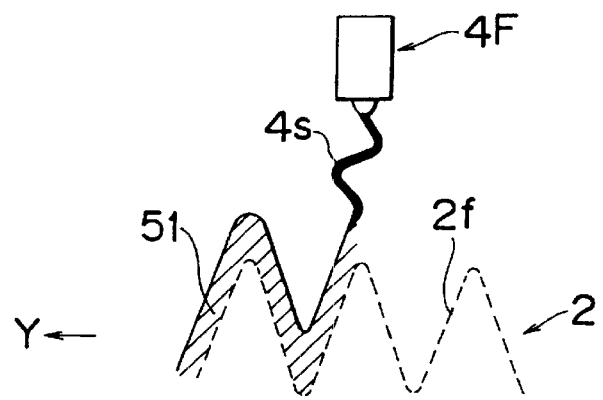
FIGS. 9A through 9C are schematic views showing production steps in another production method of the filter according to the fourth embodiment of the invention.
Figure 9B:
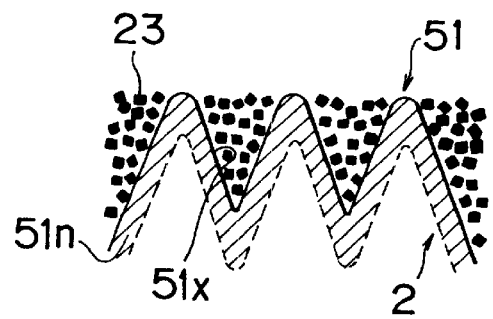
Figure 9C:
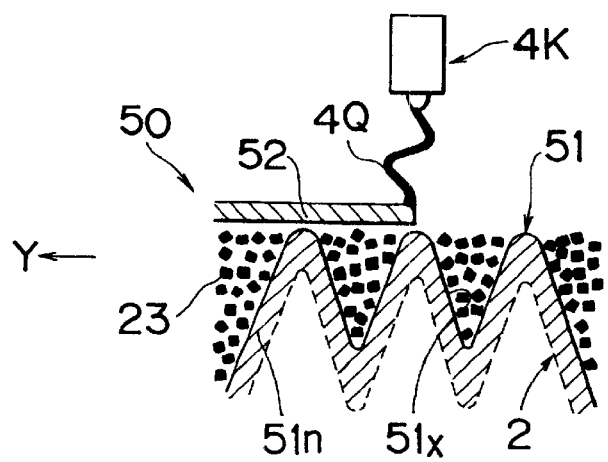

In the above-described production method of the filter 50, an existing filter may be used as the first nonwoven fabric 51, or the first nonwoven fabric 51 may be produced by pressing a flat plate-like nonwoven fabric. Alternatively, it is also possible to form the first nonwoven fabric 51 by spinning a partially melted fibers 4S to the forming surface 2f of the forming die 2 as shown in FIG. 9A. The production steps (FIGS. 9B and 9C) to complete the filter 50 after the first nonwoven fabric 51 is formed are as described above.

In this way, in the filter 50 of this embodiment, the recesses 51x of the corrugated portion 51n of the first nonwoven fabric 51 are filled with particles of the activated carbon 23. Therefore, even if the wall surfaces of the recesses 51x of the corrugated portion 51n try to deform in the direction in which the wall surfaces tightly contact each other by a negative pressure of fluid flowing through the filter 50, the deformation is suppressed by the particles of the activated carbon 23 filled in the recesses 51x. Thus, it is possible to prevent ventilation resistance of the filter 50 from being increased.

Although an example was given in which the particles of the activated carbon 23 are accommodated in the recesses 51x, it is possible to suppress the deformation of the corrugated portion 51n of the first nonwoven fabric 51 by accommodating activated carbon fiber, deodorant or the like instead of or in addition to the activated carbon 23.

Also, although the recesses 51x of the corrugated portion 51n of the first nonwoven fabric 51 have inverse triangular cross sections, the shape of the cross sections of the recesses 51x can be changed appropriately.

Fifth Embodiment

Figure 10:
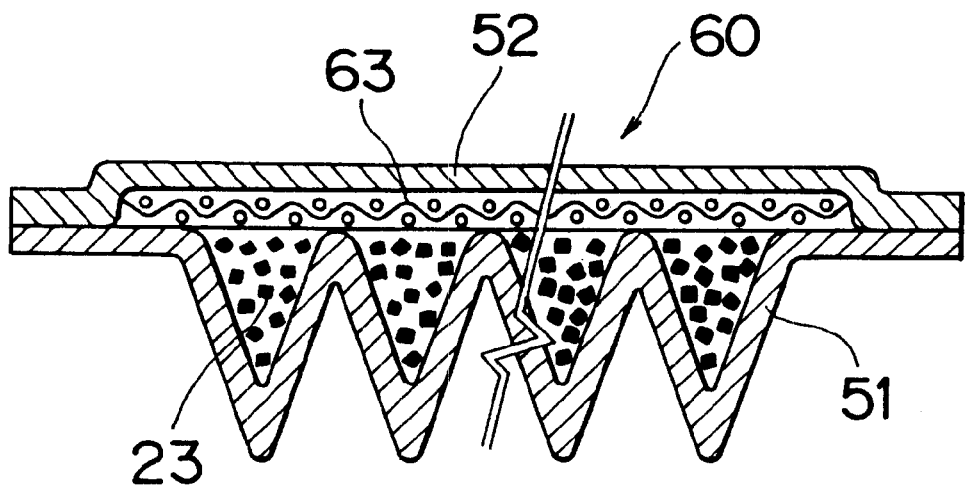
FIG. 10 is a vertical sectional view of a filter according to a fifth embodiment of the invention.

A filter and a production method according to a fifth embodiment of the invention will hereinafter be described based on FIG. 10 and FIGS. 11A through 11D. As shown in FIG. 10, in a filter 60 according to the fifth embodiment, a retaining mesh 63 for retaining the particles of the activated carbon 23 is disposed between the first nonwoven fabric 51 and the second nonwoven fabric 52 of the filter 50 according to the fourth embodiment. The other structure is the same as that of the filter 50 according to the fourth embodiment.

Next, a production method of the filter 60 will be described based on FIGS. 11A through 11D.

Figure 11A:
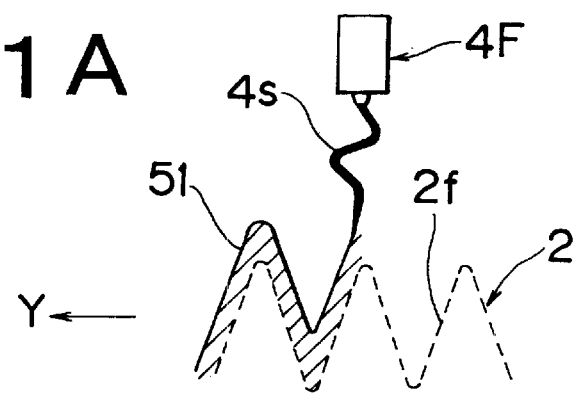
FIGS. 11A through 11D are schematic views showing production steps in a production method of the filter according to the fifth embodiment of the invention.

First, as shown in FIG. 11A, partially melted fibers 4S are spun on the forming surface 2f of the forming die 2 from the upstream nozzles 4F to form the first nonwoven fabric 21. An existing filter may be used as the first nonwoven fabric 51 as it is, for example, or a flat plate-like nonwoven fabric may be pressed to form the first nonwoven fabric 51.

Figure 11B:
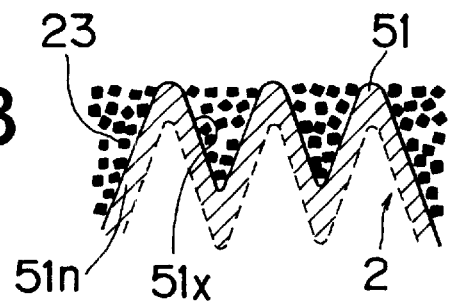
Figure 11C:
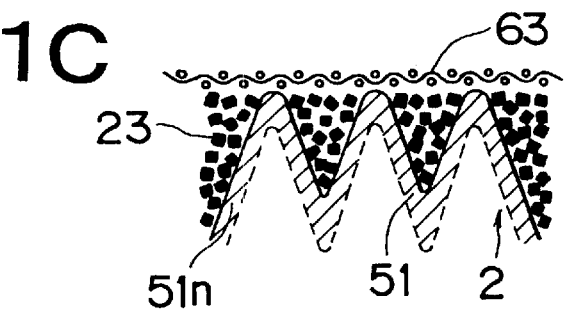
Figure 11D:
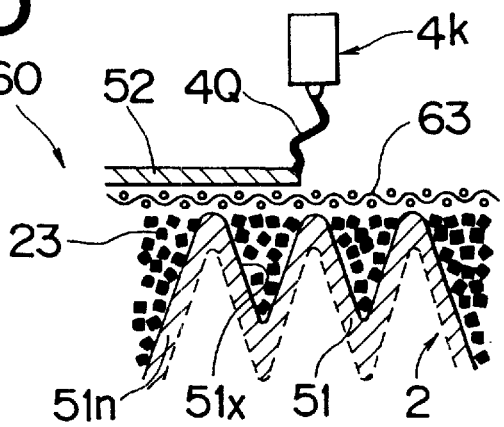
Figure 12:
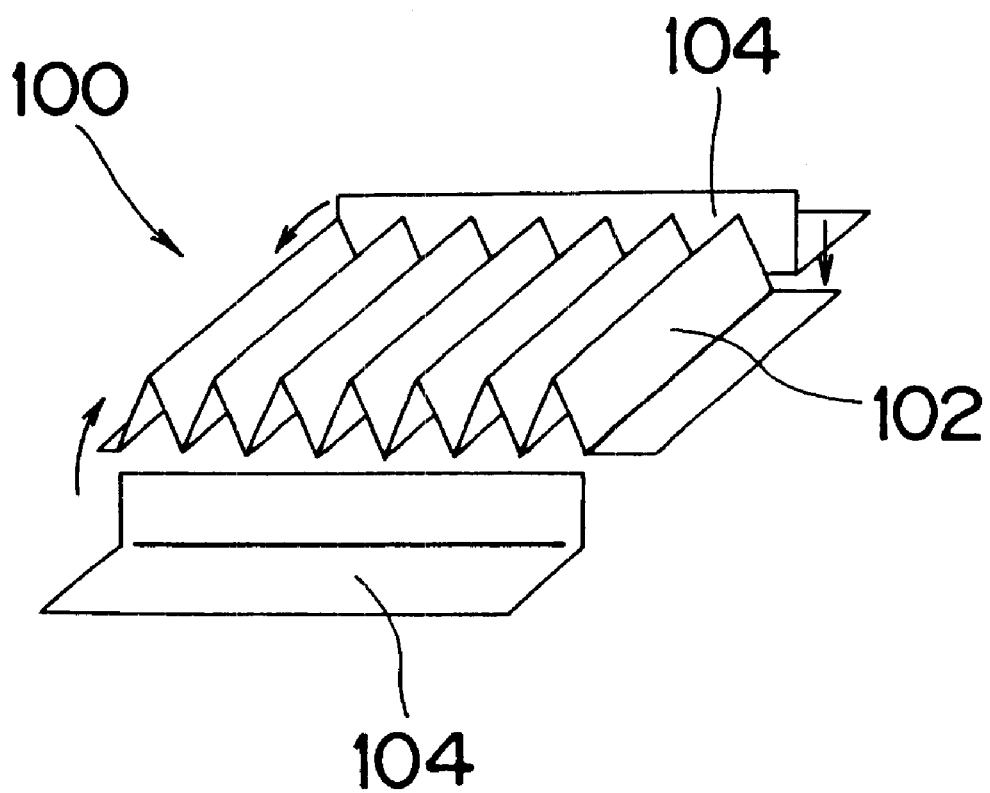
FIG. 12 is an exploded perspective view showing a conventional production process of a filter.

The first nonwoven fabric 51 formed in this manner is transferred to the supply position of the activated carbon 23, and as shown in FIG. 11B, the particles of the activated carbon 23 are supplied to the recesses 51x of the corrugated portion 51n of the first nonwoven fabric 51.

Next, the flat plate-like retaining mesh 63 is set so as to cover from the corrugated portion 51n of the first nonwoven fabric 51 to the periphery of that corrugated portion 51n. When the first nonwoven fabric 51 covered with the retaining mesh 63 reaches the position of the downstream nozzles 4K, the partially melted fibers 4Q spun from the downstream nozzles 4K are deposited on the first nonwoven fabric 51 and the retaining mesh 63. With this operation, the second nonwoven fabric 52 is formed on the first nonwoven fabric 51 and the retaining mesh 63 by the partially melted fibers 4Q, and the filter 60 is complete.

In this manner, with the filter 60 according to this embodiment, since the flat plate-like retaining mesh 63 covers the corrugated portion 51n of the first nonwoven fabric 51 and the periphery thereof, it is possible to reliably prevent the particles of the activated carbon 23 accommodated in the recesses 51x of the corrugated portion 51n from falling out by using the retaining mesh 63, and the rigidity of the filter 60 is also enhanced.

While the systems and methods according to this invention have been described in conjunction with the specific embodiments described above, many equivalent alternatives, modifications and variations will become apparent to those skilled in the art once given this disclosure. Accordingly, the preferred embodiments of the invention as set forth above are considered to be illustrative and not limiting. Various changes to the described embodiments may be made without departing from the spirit and scope of the invention.

For example, while the filter material of each embodiment described above is shown to have a cross-sectional shape with triangular corrugations, non-triangular cross-sections are also possible. For example, undulating wave-shaped cross sections or scallop-shaped cross sections are possible.

What is claimed is:

1. A method of manufacturing a filter medium, comprising the steps of:

preparing a first fiber layer having a shape substantially identical to a final shape of a side surface of said filter medium, wherein the final shape is a non-flat plane shape;

disposing a function member on a surface of said first fiber layer; and forming a second fiber layer by spinning and depositing partially melted fiber on said function member disposed on the surface of said first fiber layer.

2. A method according to claim 1, wherein preparing said first fiber layer comprises forming said first fiber layer by spinning partially melted fiber onto a die surface.

3. A method according to claim 1, wherein disposing said function member comprises inserting said function member into a recess of a bag portion provided in a filter portion of said first fiber layer.

4. The method of claim 2, wherein the die surface has a shape substantially identical to the shape of the side surface of the filter medium.

5. The method of claim 4, wherein the die surface has a corrugated shape.

6. The method of claim 1, wherein the final shape is a corrugated shape.

7. The method of claim 6, wherein a shape of the second fiber layer is a corrugated shape.

8. The method of claim 1, wherein the function member comprises a non-fiber material.

9. The method of claim 1, where the function member comprises a skeleton frame.

10. An intermediate filter medium product manufactured by the method of claim 4, comprising:

the die having the die surface with a shape substantially identical to a final shape of a filter medium;

the first layer of spun-bonded fibers disposed on the die surface;

the function member disposed on the surface of said first layer; and the second layer of spun-bonded fibers disposed on a surface of said function member.

11. A method of manufacturing a filter medium, comprising the steps of:

preparing a first fiber layer having a shape substantially identical to a final shape of a side surface of said filter medium;

disposing a function member on a surface of said first fiber layer; and forming a second fiber layer by spinning partially melted fiber on said function member disposed on the surface of said first fiber layer, wherein in the step of disposing said function member, an outer edge of said function member is located inward of an edge of said first fiber layer, leaving an edge portion of the first fiber layer exposed, and forming said second fiber layer comprises spinning the partially melted fiber onto said function member and the edge portion of said first fiber layer.

12. A method according to claim 11, wherein in a state in which said second fiber layer has plasticity, a portion of said second fiber layer superposed on the edge portion of said first fiber layer is pressed against said edge portion.

13. A method of manufacturing a filter medium, comprising the steps of:

preparing a first fiber layer having a shape substantially identical to a final shape of a side surface of said filter medium;

disposing a function member on a surface of said first fiber layer; and forming a second fiber layer by spinning partially melted fiber on said function member disposed on the surface of said first fiber layer, wherein in the step of disposing said function member, an outer edge of said function member is located outward of an outer edge of said first fiber layer.

14. A method of manufacturing a filter medium, comprising the steps of:

preparing a first fiber layer having a shape substantially identical to a final shape of a side surface of said filter medium;

disposing a function member on a surface of said first fiber layer;

forming a second fiber layer by spinning partially melted fiber on said function member disposed on the surface of said first fiber layer; and disposing a mesh on said function member prior to forming said second fiber layer.

15. A method of manufacturing a filter medium, comprising the steps of:

preparing a first fiber layer having a shape substantially identical to a final shape of a side surface of said filter medium;

disposing a function member on a surface of said first fiber layer; and forming a second fiber layer by spinning partially melted fiber on said function member disposed on the surface of said first fiber layer, wherein the final shape is a corrugated shape, and a shape of the second fiber layer is a substantially flat shape.

16. A method of manufacturing a filter medium, comprising the steps of:

preparing a first fiber layer having a shape substantially identical to a final shape of a side surface of said filter medium;

disposing a function member on a surface of said first fiber layer; and forming a second fiber layer by spinning partially melted fiber on said function member disposed on the surface of said first fiber layer, wherein the function member comprises one or more of a particulate activated carbon, a powdery activated carbon and an activated carbon fiber.

17. A filter medium manufactured by the method of claim 1.

18. A filter medium manufactured by the method of claim 2.

19. A filter medium manufactured by the method of claim 3.

20. A filter medium manufactured by the method of claim 6.

21. A filter medium manufactured by the method of claim 7.

22. A filter medium manufactured by the method of claim 9.

23. A filter medium manufactured by the method of claim 11.

24. A filter medium manufactured by the method of claim 13.

25. A filter medium manufactured by the method of claim 14.

26. A filter medium manufactured by the method of claim 15.

27. A filter medium manufactured by the method of claim 16.

* * * * *